US012585332B2

(12) United States Patent
Millson et al.

(10) Patent No.: US 12,585,332 B2
(45) Date of Patent: Mar. 24, 2026

(54) HAPTIC SYSTEM AND METHOD

(71) Applicant: Sony Interactive Entertainment Inc., Tokyo (JP)

(72) Inventors: Jason Craig Millson, London (GB); Lloyd Preston Stemple, London (GB); Mandana Jenabzadeh, London (GB); Maria Chiara Monti, London (GB); Christopher George Buchanan, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 225 days.

(21) Appl. No.: 18/337,618

(22) Filed: Jun. 20, 2023

(65) Prior Publication Data

US 2023/0418383 A1      Dec. 28, 2023

(30) Foreign Application Priority Data

Jun. 23, 2022    (GB) ..................................... 2209205

(51) Int. Cl.
*G06F 3/01*          (2006.01)
*H04R 25/00*       (2006.01)
(52) U.S. Cl.
CPC ........... *G06F 3/016* (2013.01); *H04R 25/606* (2013.01); *H04R 2460/13* (2013.01)
(58) Field of Classification Search
None
See application file for complete search history.

(56) References Cited

U.S. PATENT DOCUMENTS

| | | | | |
|---|---|---|---|---|
| 9,766,481 | B1 * | 9/2017 | Asfaw | ..................... G02C 11/06 |
| 9,959,783 | B2 * | 5/2018 | Hughes | .............. H04M 19/047 |
| 10,419,843 | B1 * | 9/2019 | Mehra | .................... H04R 5/033 |
| 10,754,428 | B1 | 8/2020 | Parise | |
| 10,824,390 | B1 * | 11/2020 | Khaleghimeybodi | ...................... G02B 27/017 |
| 2018/0356893 | A1 | 12/2018 | Soni | |
| 2020/0175761 | A1 | 6/2020 | Jones | |
| 2021/0082187 | A1 | 3/2021 | Gavriliuc | |
| 2021/0089266 | A1 | 3/2021 | Khaleghimeybodi | |

FOREIGN PATENT DOCUMENTS

| | | | | |
|---|---|---|---|---|
| EP | 4296825 | A2 | 12/2023 | |
| WO | 2014152630 | A1 | 9/2014 | |
| WO | WO-2022259066 | A1 * | 12/2022 | ........... H04R 25/554 |

OTHER PUBLICATIONS

Combined Search and Examination Report for corresponding GB Application No. 2209205.0, 13 pages, dated Mar. 2, 2023.
Examination Report for corresponding GB Application No. 2209205.0, 5 pages, dated Aug. 22, 2024.

(Continued)

*Primary Examiner* — K. Wong
(74) *Attorney, Agent, or Firm* — Kilpatrick Townsend & Stockton LLP

(57)          ABSTRACT

A haptic feedback method includes: providing a wearable haptic feedback device comprising one or more bone-conduction haptic feedback units, and driving the one or more bone conduction haptic feedback units with at least a first signal processed using a bone conduction head related transfer function, 'bHRTF'.

19 Claims, 7 Drawing Sheets

(56)               References Cited

OTHER PUBLICATIONS

Stanley, "Measurement and Validation of Bone Conduction Adjustment Functions in Virtual 3D Audio Displays" A Dissertation Presented to The Academic Faculty, 169 pages, Aug. 1, 2009.

Walker et al. "Navigation Performance in a Virtual Environment with Bonephones" Proceedings of ICAD 05 Eleventh Meeting of the International Conference on Auditory Display, pp. 260-263, Jul. 69, 2005.

McDonald et al. "Spatial audio through a bone conduction interface" International Journal of Audiology, pp. 595-599, Jun. 21, 2006.

Lindeman et al.: "Hear-Through and Mic-Through Augmented Reality: Using Bone Conduction to Display Spatialized Audio" 2007 6th IEEE Xplore and AACM International Symposium on Mixed and Arguments Reality, pp. 173-176, Mar. 1, 2007.

McBride et al. "Effects of Bone Vibrator Locations on Auditory Localization in the Horizontal Plane" Proceedings of the XXIVth Annual International Occupational Ergonomics and Safety Conference, pp. 156-161, Jun. 7-8, 2012.

Extended European Search Report for corresponding EP Application No. 23179002.3, 15 pages, dated Jan. 5, 2024.

Examination Report for corresponding GB Application No. 2209205.0, 5 Pages, dated Dec. 13, 2024.

* cited by examiner s810

Provide a wearable haptic feedback device comprising one or more bone-conducting haptic feedback units s820

Drive the one or more bone conducting haptic feedback units with at least a first signal processed using a bone conduction head related transfer function, 'bHRTF'

HAPTIC SYSTEM AND METHOD

BACKGROUND OF THE INVENTION

Field of the Invention

The present invention relates to a haptic system and method.

Description of the Prior Art

Existing haptic systems are typically concerned with providing either hand-held or whole-body haptic experiences. However, there is scope for haptic interfaces that provide alternative and/or additional sensory input that may enrich an experience (whether pre-recorded or interactive), or assist a person with sensory or attentional needs to assimilate information relating to the experience.

The present invention seeks to address or alleviate this need.

SUMMARY OF THE INVENTION

Various aspects and features of the present invention are defined in the appended claims and within the text of the accompanying description.

In a first aspect, a haptic feedback method is provided as per claim 1.

In another aspect, a haptic feedback system is provided as per claim 13.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
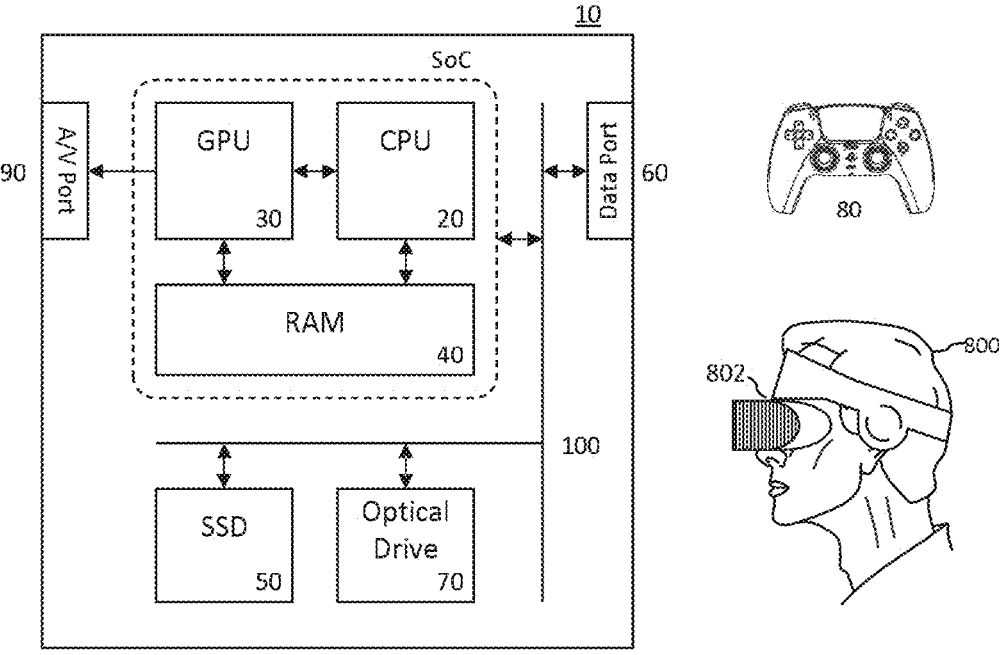
FIG. 1 is a schematic diagram of an entertainment system comprising an audio processor in accordance with embodiments of the present description.

A haptic system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Referring to the drawings, like reference numerals designate identical or corresponding parts throughout the several views.

In embodiments of the present description, a wearable haptic feedback device is provided that outputs haptic signals processed using a bone conduction head-related transfer function (bHRTF).

Notably, this is different to using bone conduction head-phones playing audio processed using an audio (air transmission) HRTF.

Figure 2A:
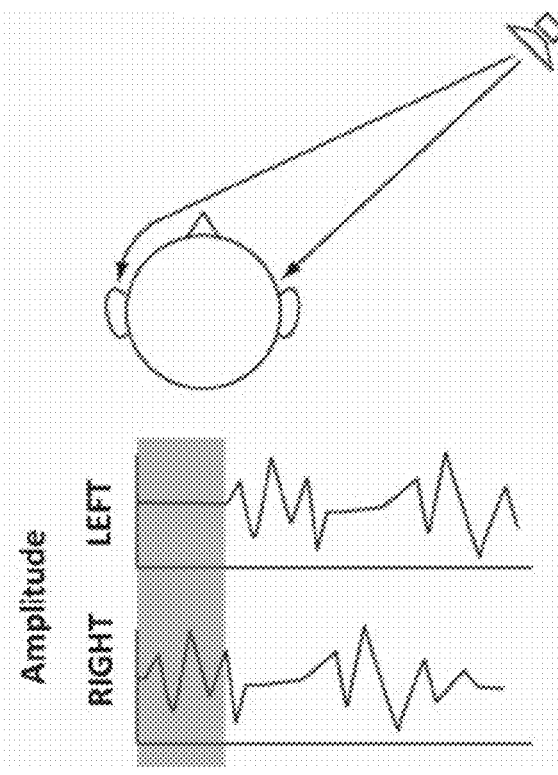
FIGS. 2A and 2B are schematic diagrams illustrating inter-ear timing and level differences.
Figure 2B:
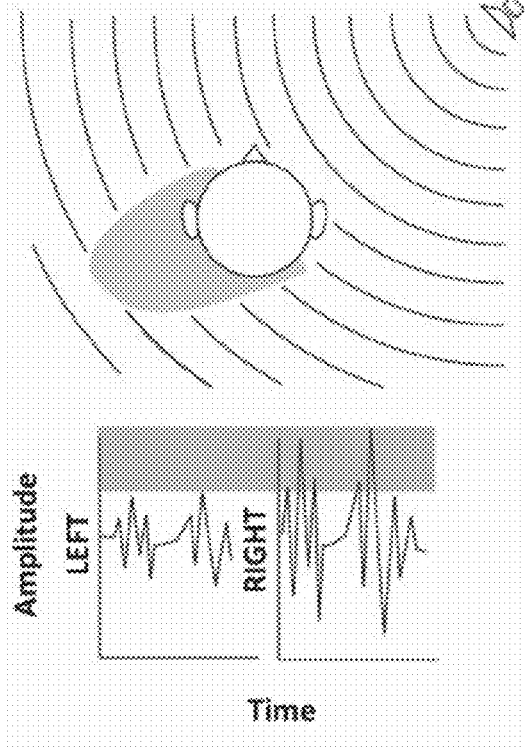
Figure 3A:
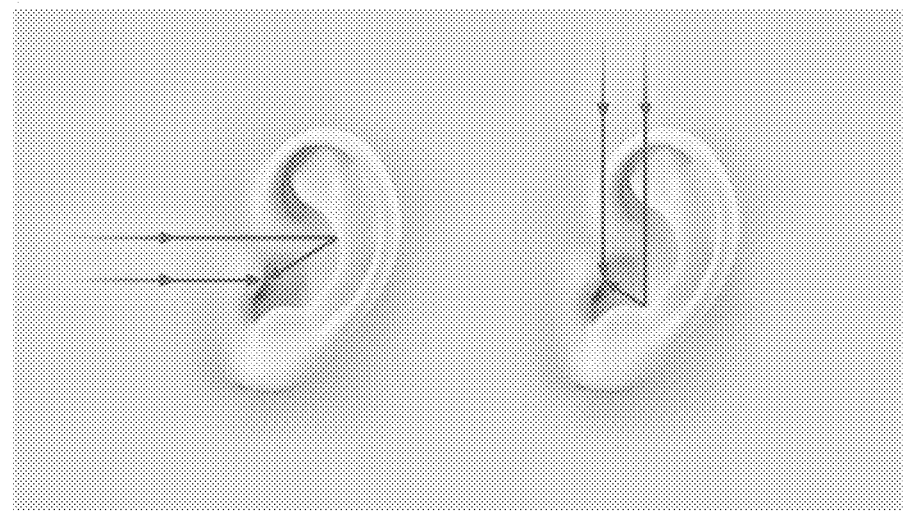
FIGS. 3A and 3B are schematic diagrams illustrating elevation-dependent frequency sensitivities.
Figure 3B:
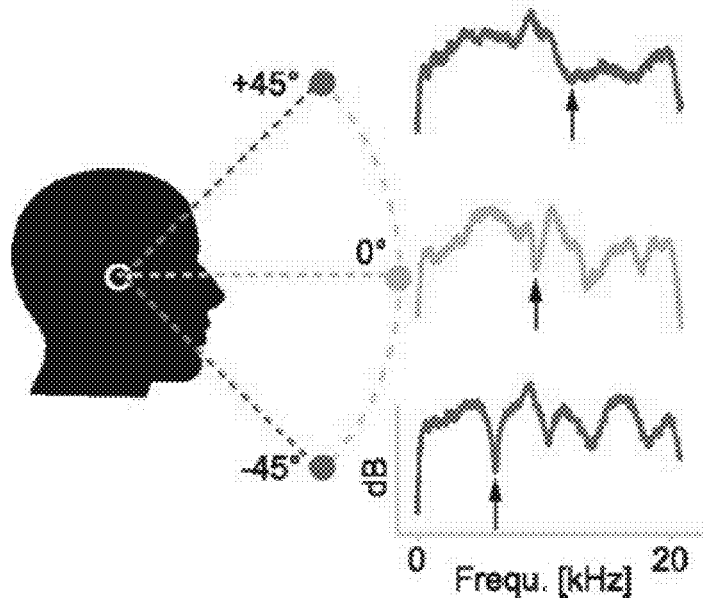

Referring to FIGS. 2 and 3, it will be appreciated that conventional HRTFs capture differences in inter-ear timings (FIG. 2A) for audio caused by the difference in path length between each ear from the audio source, and inter-ear differences in level (FIG. 2B) caused by shadowing and diffraction/interference effects of the user's head, as well as modifications in frequency response caused by the interaction of the incident audio wave and various frequency dependent amplification properties of the outer ear (FIGS. 3A and 3B).

By contrast, a bone conduction bHRTF will have different properties; attenuation around and through the user's head will be different for haptic signals directly coupled to the user's head, and timings (whether specifically inter-ear or more generally between two points on the users head) will also be different due to the different propagation rates of audio within the user's head as opposed to through the air.

However, in a similar manner to an air propagated audio HRTF, which produces a spatially localised sense of sound (often called 3D audio), a bone conducted haptic bHRTF can produce a spatially localised sense of touch or vibration (e.g. a 3D haptic effect); although in this case, there will be a physical sense of touch or vibration caused by touch receptors on the skin of the user's head, and separately the virtual sense of touch or vibration generated by the processed signals—however, the user can habituate to the physical sense whilst using the virtual sense for immersion or information.

An audio HRTF can be obtained by placing microphones within the ear canal of the user or of a dummy head, and using the signals derived from these together with the source audio signal and remote source location to compute a transfer function. Typically this is achieved by determining the in-ear impulse or frequency response of the user for a plurality of source audio signal positions, for example in a sphere around them.

Figure 4:
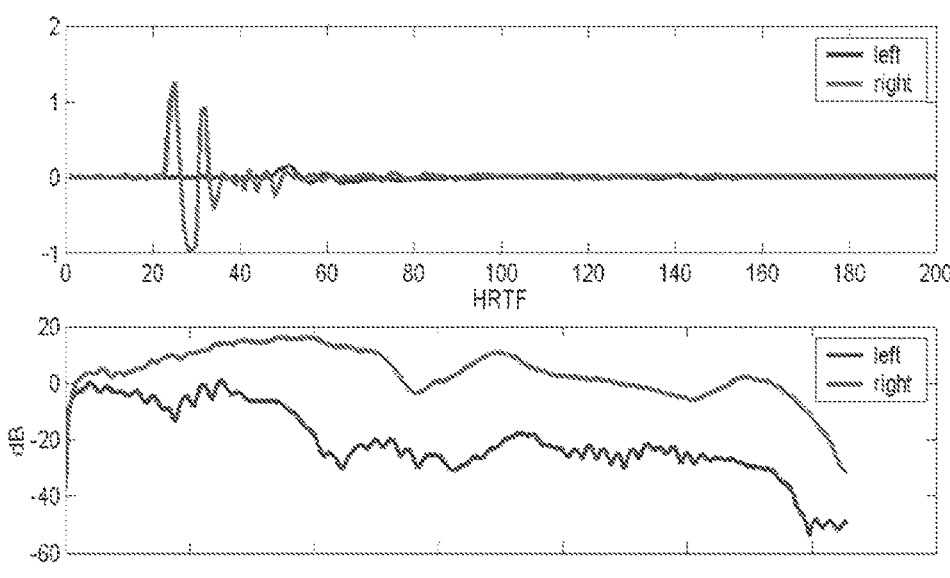
FIG. 4 is a schematic diagram of an impulse response in time and frequency.

Referring to FIG. 4, for a sound (e.g. an impulse such as a single delta or click) at each sampled position, a recorded impulse response within the ear (for example using a microphone positioned at the entrance to the ear canal) is obtained, as shown in the upper graph. A Fourier transform of such an impulse response is referred to as a frequency response, as shown in the lower graph of FIG. 4. Collectively, these impulse responses or frequency responses can be used to define an HRTF, which describes the effect as heard by each ear of the user's head (e.g. head shape, facial features, outer ear shape etc.) on the received frequency spectrum for that point in space.

Figure 5:
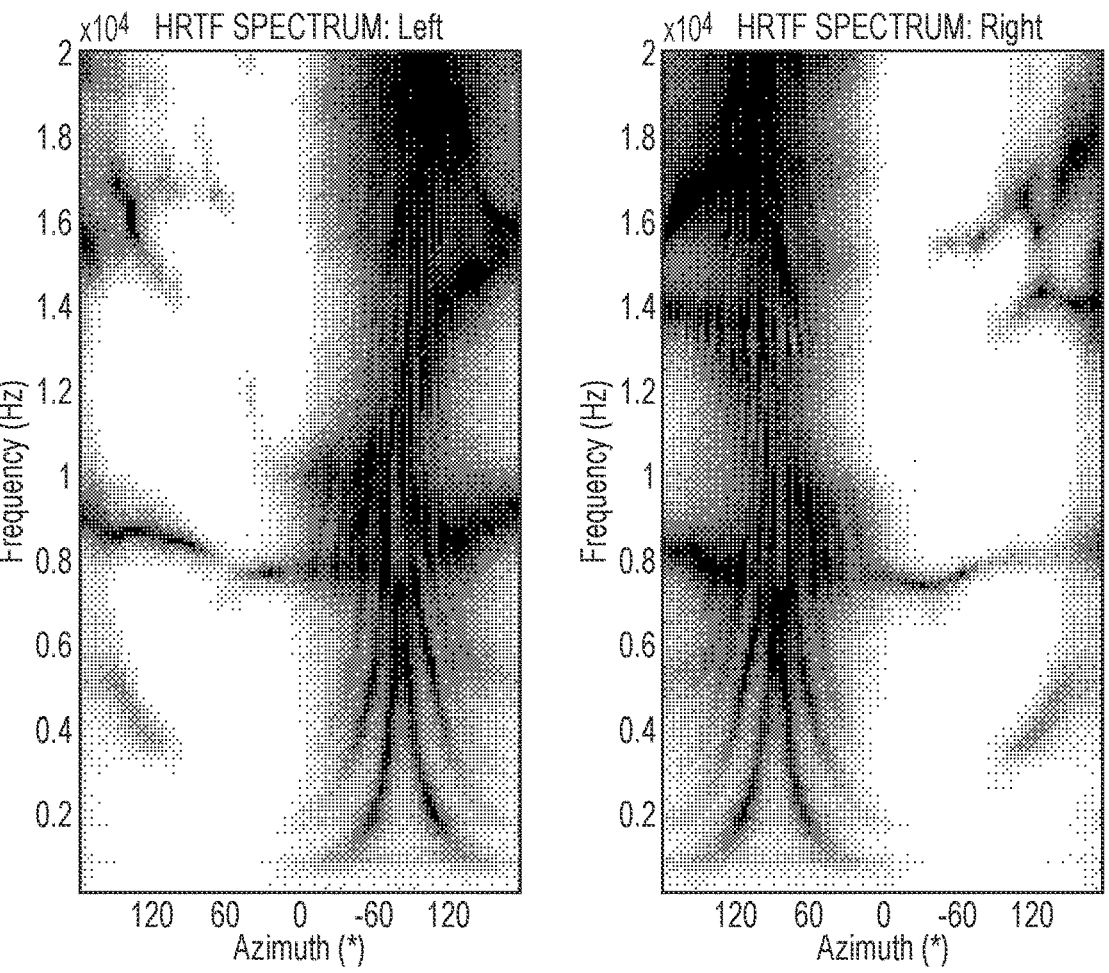
FIG. 5 is a schematic diagram of a head related transfer function.

Measured over many positions, a full HRTF can be computed, as partially illustrated in FIG. 5 for both left and right ears (showing frequency on the y-axis versus azimuth on the x-axis). Brightness is a function of the Fourier transform values, with dark regions corresponding to spectral notches.

An HRTF typically comprises a time or frequency filter (e.g. based on an impulse or frequency response) for a series of positions on a sphere or partial sphere surrounding the user's head (e.g. for both azimuth and elevation), so that a sound, when played through a respective one of these filters, appears to come from the corresponding positon/direction. The more measured positions on which filters are based, the better the HRTF is. For positions in between measured positions, interpolation between filters can be used. Again, the closer the measurement positions are to each other, the better (and less) interpolation there is.

This process is known in the art and not described further herein.

Notably, a dummy head can be used in lieu of a user because the structural properties of the user's head, beyond its external shape, are not relevant to computation of the HRTF—except optionally to roughly match the acoustic impedance of skin to better model skin surface reflections and absorptions.

However for the proposed bone conduction bHRTF, the structural properties of the user's head (or generically a person's head) become relevant, as the propagation behaviour of waves from a haptic source around and through the head will depend on properties of the skin, skull, and brain, which in turn may differ at different points on the user's head.

In particular, it can be expected that the inter-ear (or more precisely, inter-measuring-point) propagation delay between left and right will be shorter than for air, because propagation through the skull will be faster than through air. Meanwhile propagation delay directly through the head is likely to have a location/direction specific difference due to the combination of a different propagation speed through the brain and a different path length. Similarly the inter-ear (or more precisely, inter measuring point) levels will also be different to air and different for each of the skull propagation path and brain propagation path. These differences enable directional perception in much the same way that differences in path length and level directional perception by the ear. It is also possible that differences in frequency specific attenuation between the different propagation paths can also contribute to a perception of direction, much as different frequency response due to the structure of the pinna can for air based directional perception.

Figure 6:
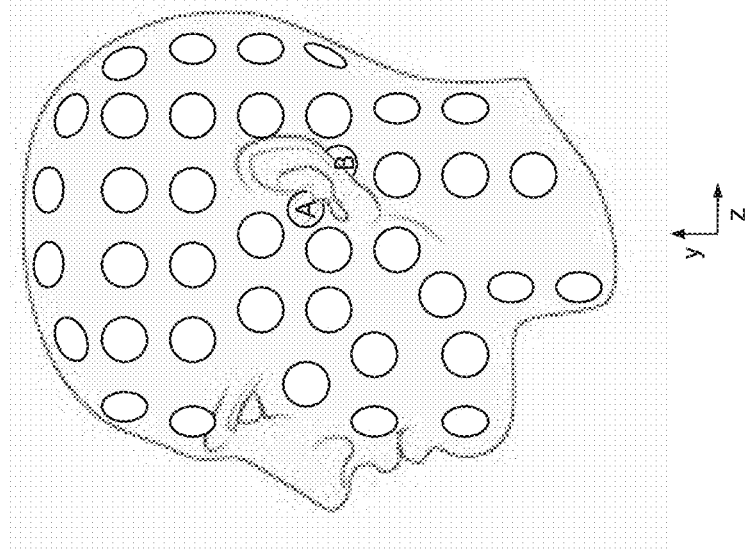
FIG. 6 is a schematic diagram of a measurement scheme in accordance with embodiments of the present description.
Figure 6:
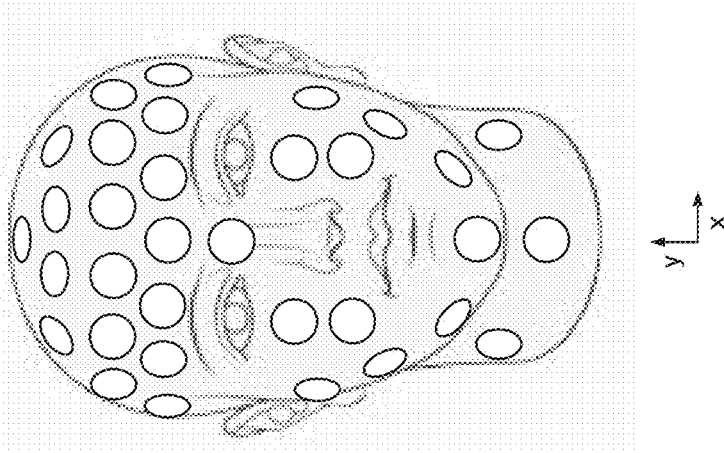

Accordingly, and referring now to FIG. 6, in an embodiment of the present description one or more haptic vibration sensors (which may for example be microphones with a suitable frequency response to encompass the desired haptic vibration range) are placed in physical contact with the head of a user, at positions corresponding to the subsequent placement of haptic drivers that will be used to generate the 3D haptic effect.

A preferred but not essential position for both the sensors and subsequently the drivers is forward of the tragus of the pinna (marked as location A), typically in an area 0-2 cm toward the face. Another preferred but not essential position for both the sensors and subsequently the drivers is the upper jaw directly behind the lobe/antitragus (marked as location B). One of both of these may be used by a subsequent driver system, or neither (for example if a headband or cap arrangement is used rather than a headphone or hearing-aid style arrangement). It will be appreciated that measurements will typically be taken at corresponding measurement positions on both sides of the head.

Then, excitation signals are applied to different positions on the user's head. A non-limiting example set of positions is illustrated using circles in FIG. 6. More generally a roughly equidistant distribution of sample points can be used over the user's head and optionally face, particularly tracing the user's bone structure (e.g. skull, optionally including brow, cheeks, and/or upper jaw), lower jaw, and/or neck. These signals can be applied for any suitable frequency range expected to be used by a subsequent wearable haptic feedback device, and may be haptic-only and/or encompass bone conduction audio. Such frequency ranges are discussed elsewhere herein.

Then, in a manner analogous to the air-conduction HRTF described previously herein, signals obtained from the sensors together with the source excitation signals and the location of the excitation on the user's head can be used to compute a bone-conduction bHRTF.

Subsequently, haptic drivers may be used at the or each measurement location (e.g. A and/or B, and/or elsewhere on the user's head), and supplied with signals processed using the bone conduction bHRTF to provide a signal that corresponds to the signal received at that point when excited by a haptic excitation at one or more locations on the user's head. The user can then determine the source direction or location of the perceived haptic excitation.

In this way, users who are hearing impaired may be able to receive haptic directional cues similar to 3D audio directional cues, whilst other users may also benefit from the directional haptic experience, either for immersion or from having a separate sensory information channel (when for example the visual or auditory perception is already crowded or overwhelmed).

A wearable and bone conduction haptic feedback unit may comprise one or more drivers, for example to provide low and/or high frequency outputs.

Low frequency drivers may provide haptics in a generally infrasound frequency range (e.g. in a non-limiting range of 1-10 Hz to 5-20 Hz), and/or a generally deep bass range (e.g. a non-limiting range of 15-50 Hz to 50-250 Hz). Such drivers are provided primarily to generate haptic inputs Meanwhile high frequency drivers may provide haptics in a generally audible frequency range (e.g. a non-limiting range of 50-250 Hz to 2000-8000 Hz). Such drivers are provided primarily to generate directional bone-conduction audio (e.g. dialog).

Hence optionally a wearable haptic feedback unit may comprise both a low and high frequency driver. Typically a wearable haptic feedback device such as a haptic headset will then comprise a wearable haptic feedback unit on both sides of the head.

As noted elsewhere herein, such a wearable haptic feedback device can provide alternative and/or additional sensory input that may enrich an experience (whether prerecorded or interactive), or assist a person with sensory or attentional needs to assimilate information relating to the experience. In particular, providing directional/spatial haptic input can provide situational awareness of events or character interactions without the need to show them graphically (or if shown graphically, without the need to assume that the user is, or is able to, focus attention on them at the relevant time). Similarly directional/spatial haptic input can enrich the immersion of a virtual environment. Meanwhile either separately or in concert with haptic feedback, directional/spatial bone conduction audio can similarly provide awareness and immersion, particularly for users with outer and middle ear hearing impairment, or for users who wish to retain an awareness of the real environment by not covering their ears with headphones.

Variations

Users may not be used to haptic inputs on their heads, or for example directional bone conduction audio. Therefore optionally the user may be trained to understand the subjective haptic or bone conduction audio they are experiencing.

For example, a user, wearing a bone conduction headset, may be provided with haptics and/or audio processed using the bone conduction bHRTF to appear to come from a particular location, and also be provided with a graphical indication of the location. For example in the case of a virtual reality headset, the user could look around to identify the location, and the processed haptics and/or audio change as they move their head to maintain the relative position of the location. The user can then visibly locate the source and kinaesthetically understand how the source moves over their head as they change their head position.

Using this approach, the user can learn to identify the effective location of the haptic and/or audio. The approach could be made entertaining for example by challenging the user to point to the effective location without looking at it once they feel confident doing so, and scoring their accuracy.

Such accuracy score could in turn be used to the type of directional information provided; for example a user who has poor accuracy may be provided with simple left or right type haptics, which may guide them to turn their head towards relevant information, whereas a user who has higher accuracy may be provided with haptics indicating a degree of left or right, and/or a degree of forward and back, and/or a degree of up-and-down, so that a more precise directional queue can be provided for the haptics and/or audio. It will be appreciated that the precise relationship between accuracy or other user feedback and the type of directionality chosen may be at a designers discretion.

For some users who are hearing impaired, for example due to outer or middle ear problems, but whose cochlear otherwise works normally and responds to a conventional audio frequency range, or for users who do not have any hearing impairment, then bone-conduction audio may be provided over the conventional frequency range. Optionally higher frequencies may be boosted to account for higher rates of attenuation at these frequencies.

However, for users who are hearing impaired such that their cochlear does not respond to a conventional audio frequency range, and in particular is attenuated within the frequency range of conventional speech (for example in the range 500 Hz to 8 kHz, and typically showing progressive attenuation from higher to lower frequencies), then pre-recorded or otherwise generated audio, and in particular dialogue, may be mapped to lower frequencies that the user can still hear. Such mapping may be done for example using wavelet transforms. This mapping may be done as the audio is generated, for example as a precursor step to HRTF processing, or may be pre-processed and supplied as a parallel audio dataset. Where the mapping is performed as part of the current processing, optionally it may be made responsive to an audiometric test performed using the haptic drivers, for example as part of a calibration process.

Similarly it will be appreciated that, as noted above, a wearable bone conduction haptic feedback unit 56 may comprise multiple drivers, typically one being a low frequency driver and another being a high frequency driver. It will be appreciated that optionally the low frequency driver receives a separate haptic signal whilst the high frequency driver receives a different audio signal, and that these may relate to entirely separate content and in-game events. However alternatively or in addition they may receive signals that complement each other, for example to provide a wide spectrum impulse, or music, or the like. The separate haptic signal may be derived from specific haptic feedback data, and/or may be derived from low-frequency components of audio data.

Figure 7B:
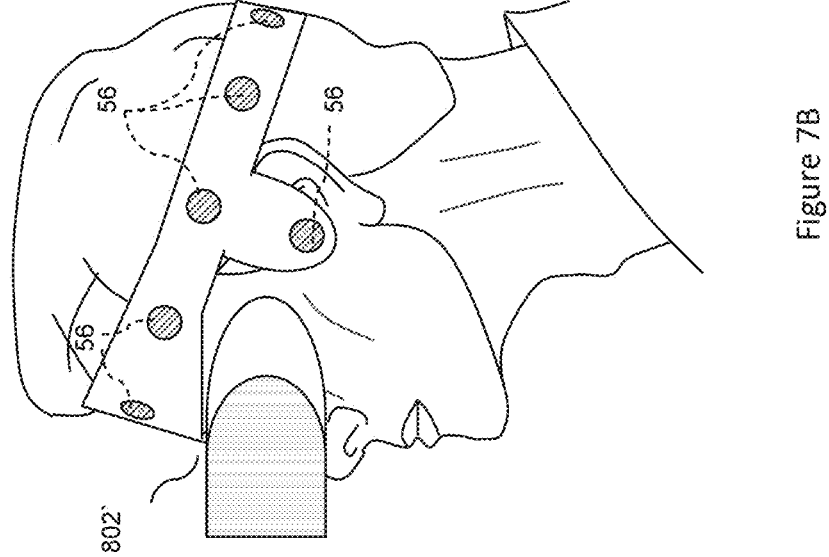
FIGS. 7A and 7B are schematic diagrams of wearable haptic feedback devices in accordance with embodiments of the present description.
Figure 7A:
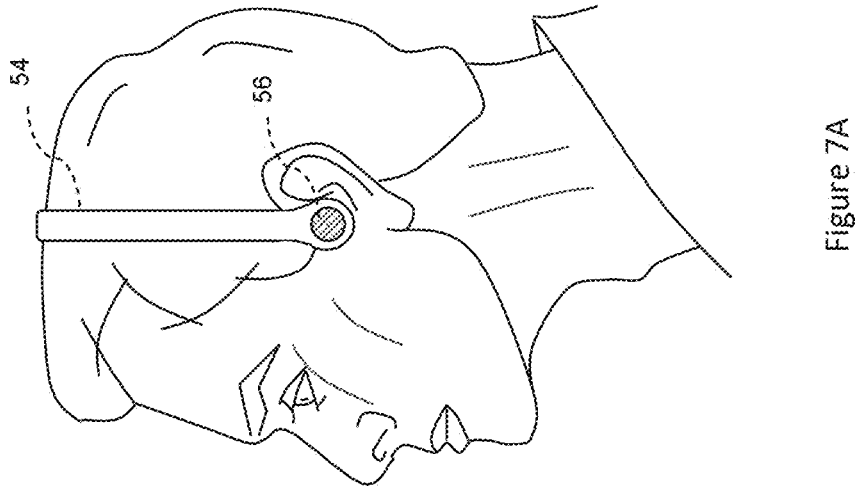

As noted elsewhere herein, typically the wearable haptic feedback units, each comprising one or more haptic drivers, are worn close to the ear (for example at positions A and or B in FIG. 6), for example as headwear in one of several forms, such as part of a glasses-type wearable device, or as part of an over-the-head headphone 54 (as seen in FIG. 7A, where the location of the wearable haptic feedback unit 56 is indicated by a hatched circle), a behind-the-head head-phone, or a fit-on-the-ear earphone; but this is not essential.

Hence alternatively or in addition one, two, or more wearable bone-conduction haptic feedback units may be provided in headwear in the form of a circumferential headband. This headband may be a stand-alone item, or may be part of a virtual reality or augmented reality headset 802' (as seen in FIG. 7B, where the location of the wearable haptic feedback units 56 are indicated by hatched circles, in this case also including a unit at position A). The wearable haptic feedback units may be distributed uniformly around the headband, or may be located at predetermined locations, and/or limited by where other working components of the headband or headset permit.

Similarly alternatively or in addition one, two, or more wearable haptic feedback units may be provided in head-wear in the form of a cap, hat, or other over-the-head structure. Again this may be a stand-alone item or part of a virtual reality augmented reality headset. The wearable haptic feedback units may be distributed uniformly over the structure, or may be located at predetermined locations, and/or limited by where other working components of the structure or headset permit.

Notably a haptic headband or haptic cap provides some improved directionality by virtue of the physical spatial positioning of their wearable haptic feedback units; however in this case the bone conduction bHRTF (or potentially multiple bHRTFs for different wearable haptic feedback units) provides enhanced directionality over and above the positions of the units themselves.

It will be appreciated that other methods of acoustically coupling one or more wearable haptic feedback units to the user's skull are possible; for example a mouth guard or bite plate style device may be employed, where the user can grip the device to between their teeth and the haptic feedback units can convey their signals through the user's upper and/or lower jaw. Such a device may also comprise control elements such as tongue operable buttons, or a grip sensor, through which the user can generate inputs for the entertainment device 10.

In this case, the bone conduction bHRTF would be based upon data from sensors located in a similar mouth-guard or bite plate style device.

It will be appreciated that for air propagated audio HRTFs, whilst a generic HRTF provides adequate spatial audio, this can be improved using a personalised HRTF, or an HRTF prepared for a person with a similar head mor-phology to the current user.

The same principle applies to a bone-conduction bHRTF, although for low-frequency, infra-sound or vibration only haptic signals, this may be less important as directionality can be inherently less clear due to the comparative wavelength of the signals.

Nevertheless, and particularly for directional bone-conduction audio, it may be preferable to update or replace a generic bHRTF model with one better suited to the user's own head morphology.

In this case, it is likely to be impractical to directly test an individual user with sensors and excitation sources in the manner described elsewhere herein. Consequently, in embodiments of the present description, a user may submit measurements of their head obtained by any suitable means (for example using front and side photographs captured by a camera associated with either the entertainment device 10 or an HMD 53 associated with the user's account, and/or captured by a phone associated with a user's account).

Such photos may be compared, for example by a central server, against reference templates of a generic user's head (such as the generic head templates shown in FIG. 6) to identify differences relative to these; the server may then identify reference individuals with the closest corresponding set of differences for whom a bone-conduction HRTF has been performed, and retrieve the corresponding bone-conduction bHRTF for use by the current user.

Alternatively or in addition, such photos may be compared directly with photos of the reference individuals to find a closest morphological match, although this may introduce additional sources of error or variation for example due to incidental features in the photographs such as hair (facial or otherwise) in both photographs.

Such a library of reference individual bHRTFs may be generated by performing the tests described elsewhere herein for a representative population of reference individuals covering various ages, genders, ethnicities and the like.

This library can be increased over time, and the user's measurements can be periodically re-compared to identify whether any better morphological match than the current one, and consequently a better bone-conduction bHRTF, have been added.

Whilst the techniques herein are described with reference to a wearable haptic feedback device (such as a headset, head mounted display, headband, or cap), and a head related transfer function, in principle the approach may be used for any other part of the body, such as for example the legs, arms, and/or torso. Hence for example in the same way that headwear such as a cap on the head may provide a distribution of wearable haptic feedback units over the head, likewise a sleeve or jacket may provide a distribution of such wearable haptic feedback units over limbs or body. By using a limb or body related transfer function generated in a similar manner to the bone conduction bHRTF described elsewhere herein, such a sleeve or jacket may provide spatially fine resolution haptic feedback to the user despite having comparatively fewer wearable haptic feedback units than if the garment required direct haptic stimulation at an equivalent density of points. This can reduce both cost and weight for a haptic feedback garment.

Hence more generally a haptic feedback garment (whether a headphone, headband, cap, sleeve for limb or body, or assembled garment comprising two or more of these, for example in a wet-suit or onesie type arrangement) may comprise a suitable distribution of wearable haptic feedback units. Such a garment can also be understood to be a wearable haptic feedback device.

It will be appreciated that whilst a hierarchy of terms has been described (a wearable haptic feedback device comprising one or more wearable bone-conduction haptic feedback units, comprising in turn one or more acoustic/haptic feedback drivers), embodiments of the present description are not limited to this. For example, self-adhesive wireless haptic feedback drivers may be considered equivalent to a wearable bone-conduction haptic feedback unit or wearable haptic feedback device in that that they will similarly output at least a first signal processed using a bone conduction head related transfer function to a user. Wearable bone-conduction haptic units and wearable haptic feedback devices provide a non-limiting means by which to bundle and or distribute drivers on the user.

Figure 8:
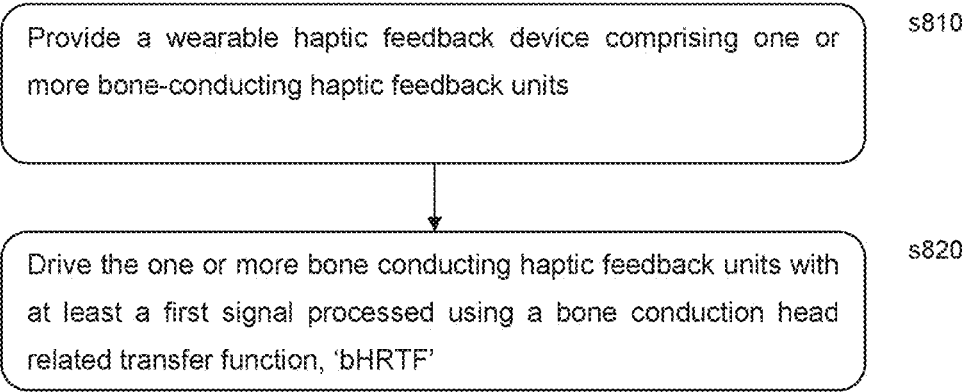
FIG. 8 is a flow diagram of a haptic feedback method in accordance with embodiments of the present description.

Turning now to FIG. 8, in a summary embodiment of the present description, a haptic feedback method comprises the following steps.

A first step s810 of providing a wearable haptic feedback device comprising one or more bone-conduction haptic feedback units; and a second step s820 of driving the one or more bone conduction haptic feedback units with at least a first signal processed using a bone conduction head related transfer function, 'bHRTF', as described elsewhere herein.

It will be apparent to a person skilled in the art that variations in the above method corresponding to operation of the various embodiments of the apparatus as described and claimed herein are considered within the scope of the present invention, including but not limited to that:

one or more of the bone conduction haptic feedback units comprise one or more selected from the list consisting of a haptic vibration driver, and an audio frequency driver, as described elsewhere herein;

in this case, optionally a bone conduction haptic feedback unit comprising a haptic vibration driver receives as a first signal a haptic signal for that driver, related to haptic feedback, as described elsewhere herein;

similarly in this case, optionally a bone conduction haptic feedback unit comprising an audio frequency driver receives as a first signal an audio signal for that driver, related to bone conduction audio, as described elsewhere herein;

the at least first signal is processed using a bHRTF derived using measurement signals taken at a wearing position of the or each bone-conduction haptic feedback unit, and excitation signals applied at a plurality of head locations, together with a measure representative of the spatial relationship between the respective wearing position and respective head location, as described elsewhere herein;

the wearable haptic feedback device positions bone-conduction haptic feedback units at one or more positions on the user's head selected from the list consisting of in front of the tragus of the left and right ears (position 'A'), and behind the antitragus of the left and right ears (position 'B'), as described elsewhere herein;

the wearable haptic feedback device distributes a plurality of bone-conduction haptic feedback units around a wearable headband, as described elsewhere herein;

the wearable haptic feedback device distributes a plurality of bone-conduction haptic feedback units over one or more selected from the list consisting of a hat or cap, a sleeve for a limb, and a sleeve or jacket for a torso, as described elsewhere herein;

the method comprises the steps of mapping a part of an audio signal that is outside a hearable frequency range of a user when using bone conduction audio into the hearable frequency range of the user when using bone conduction audio as a mapped signal, and providing the mapped signal as the at least first signal, as described elsewhere herein;

the method comprises the steps of obtaining one or more measurements characteristic of a current user's head morphology, comparing the one or more measurements to corresponding measurements of a plurality of reference individuals to identify a closest match, retrieving a bHRTF previously derived for the closest matching reference individual, and providing the retrieved bHRTF for the current user, as described elsewhere herein; and the method comprises the steps of driving the one or more bone conduction haptic feedback units with at least a first signal processed using the 'bHRTF' to correspond to a predetermined direction or location for a user, and showing the predetermined direction or location to the user to train them to recognise the haptic and/or audio sensation generated by the one or more bone conduction haptic feedback units, as described elsewhere herein.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Accordingly, in a summary embodiment of the present description, a haptic feedback system comprises the following.

Firstly, a wearable haptic feedback device (as non-limiting examples, headset 54 and HMD 53' shown in FIGS. 7A,B) comprising one or more bone-conduction haptic feedback units.

And secondly, an audio processor (for example CPU 20 of entertainment device 10, or a similar CPU of and HMD, not shown) adapted (for example by suitable software instruction) to output at least a first signal processed using a bone conduction head related transfer function, 'bHRTF', used to drive the one or more bone conduction haptic feedback units.

As noted elsewhere herein, typically the one or more of the bone conduction haptic feedback units comprise one or more selected from the list consisting of a haptic vibration driver, and an audio frequency driver.

Similarly as noted elsewhere herein, the at least first signal is processed using a bHRTF derived using measurement signals taken at a wearing position of the or each bone-conduction haptic feedback unit, and excitation signals applied at a plurality of head locations, together with a measure representative of the spatial relationship between the respective wearing position and respective head location.

The audio processor may be part of the wearable device (for example part of an HMD) or may be part of a separate device in wired or wireless communication with the wearable haptic feedback device. FIG. 1 illustrates an example of such as separate device in the form of an entertainment system 10 such as a computer or console such as the Sony® PlayStation 5® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5. As noted above, the central processor may be adapted under suitable software instruction to operate as the audio processor. The CPU 20, GPU 30, or both, may be adapted in this manner.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60. The at least a first signal processed using a bHRTF may be output in this manner.

Where components are not integrated, they may be connected as appropriate either by a dedicated data link or via a bus 100.

An example of a device for displaying images output by the entertainment system is a head mounted display 'HMD' 802, worn by a user 800.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A haptic feedback method comprising the steps of:
   providing a wearable haptic feedback device comprising one or more bone-conduction haptic feedback units; and
   driving the one or more bone conduction haptic feedback units with at least a first signal processed from an input signal using a bone conduction head related transfer function, 'bHRTF', that models how vibrations propagate through human tissue.

2. The method of claim 1, in which one or more of the bone conduction haptic feedback units comprise one or more of:
   i. a haptic vibration driver; and
   ii. an audio frequency driver.

3. The method of claim 2, wherein the input signal is related to haptic feedback, the at least first signal comprises a haptic signal, and driving the one or more bone conduction haptic feedback units comprises driving the haptic vibration driver of the one or more bone conduction haptic feedback units with the haptic signal.

4. The method of claim 2, wherein the input signal is related to bone conduction audio, the at least first signal comprises an audio signal, and driving the one or more bone conduction haptic feedback units comprises driving the audio frequency driver of the one or more bone conduction feedback units with the audio signal.

5. The method of claim 1, wherein the bHRTF is derived using measurement signals taken at a wearing position of the or each bone-conduction haptic feedback unit, and excitation signals applied at a plurality of head locations, together with a measure representative of the spatial relationship between the respective wearing position and respective head location for each of the plurality of head locations.

6. The method of claim 1, in which the wearable haptic feedback device positions the one or more bone-conduction haptic feedback units at one or more positions on the user's head including one or more of:

i. in front of the tragus of the left and right ears; and ii. behind the antitragus of the left and right ears.

7. The method of claim 1, in which the wearable haptic feedback device distributes a plurality of bone-conduction haptic feedback units around a wearable headband.

8. The method of claim 1, in which the wearable haptic feedback device distributes a plurality of bone-conduction haptic feedback units over one or more of:

i. a hat or cap;

ii. a sleeve for a limb; and iii. a sleeve or jacket for a torso.

9. The method of claim 1, further comprising the steps of:

mapping a part of an audio signal that is outside a hearable frequency range of a user when using bone conduction audio into the hearable frequency range of the user when using bone conduction audio as a mapped signal; and providing the mapped signal as the input signal.

10. The method of claim 1, comprising the steps of:

obtaining one or more measurements characteristic of a current user's head morphology;

comparing the one or more measurements to corresponding measurements of a plurality of reference individuals to identify a closest match;

retrieving a bHRTF previously derived for the closest matching reference individual; and providing the retrieved bHRTF for the current user.

11. The method of claim 1, comprising the steps of:

driving the one or more bone conduction haptic feedback units with at least a first signal processed using the 'bHRTF' to correspond to an input signal from a predetermined direction or location for a user; and showing the predetermined direction or location to the user to train them to recognize the haptic and/or audio sensation generated by the one or more bone conduction haptic feedback units.

12. The method of claim 1, wherein the bHRTF is related to attenuation and timings through a user's head for haptic signals directly coupled to a user's head.

13. The method of claim 1, wherein:

the one or more bone-conduction haptic feedback units comprise a first bone-conduction haptic feedback unit positioned by the wearable haptic feedback device to be in physical contact with a first location on a head of a user;

the one or more bone-conduction haptic feedback units comprise a second bone-conduction haptic feedback unit positioned by the wearable haptic feedback device to be in physical contact with a second location on the head of the user; and driving the one or more bone conduction haptic feedback units with the at least first signal comprises concurrently driving the first bone-conduction haptic feedback unit and the second bone-conduction haptic feedback unit with a first haptic signal and a second haptic signal, respectively, of the at least first signal to produce a virtual haptic effect spatially localized at a predetermined third location on the head of the user that is different from the first location and the second location.

14. A haptic feedback system, comprising:

a wearable haptic feedback device (54, 802') comprising one or more bone-conduction haptic feedback units; and an audio processor (20, 30) adapted to output at least a first signal processed from an input signal using a bone conduction head related transfer function, 'bHRTF', that models how vibrations propagate through human tissue, the at least first signal used to drive the one or more bone conduction haptic feedback units.

15. The haptic feedback system of claim 14, in which one or more of the bone conduction haptic feedback units comprise one or more of:

i. a haptic vibration driver; and ii. an audio frequency driver.

16. The haptic feedback system of claim 14, wherein the bHRTF is derived using measurement signals taken at a wearing position of the or each bone-conduction haptic feedback unit, and excitation signals applied at a plurality of head locations, together with a measure representative of the spatial relationship between the respective wearing position and respective head location for each of the plurality of head locations.

17. A haptic feedback method, comprising:

applying an excitation signal directly to a first location on a head of a user;

generating, by a first haptic vibration sensor in physical contact with the head at a second location, a first measurement signal of vibrations of the head at the second location caused by propagation of the excitation signal through the head from the first location to the second location;

deriving a bone conduction head related transfer function from the excitation signal, the first measurement signal, and a measure of the spatial relationship between the first location and the second location on the head;

providing a wearable haptic device comprising a first bone conduction haptic unit;

processing the excitation signal using the derived bone conduction head related transfer function to provide an input signal for the bone conduction haptic unit that corresponds to the first measurement signal; and driving the first bone conduction haptic unit with the input signal to reproduce the vibrations of the head at the second location when the first bone conduction haptic unit is placed in physical contact with the head at the second location.

18. The haptic feedback method of claim 17, wherein:

the wearable haptic device further comprises a second bone conduction haptic unit;

the bone conduction head related transfer function is further derived from:

a second measurement signal generated from vibrations of the head at a third location caused by propagation of the excitation signal through the head from the first location to the third location; and a measure of the spatial relationship between the first location and the third location;

processing the excitation signal using the derived bone conduction head related transfer function further provides a second input signal for the second bone conduction haptic unit that corresponds to the second measurement signal; and the method further comprises:

driving the second bone conduction haptic unit with the second input signal to reproduce the vibrations of the head at the third location when the second bone conduction haptic unit is placed in physical contact with the head at the third location.

19. A non-transitory, computer-readable storage medium containing a computer program comprising computer executable instructions which, when executed by one or more processors of a computer system, cause the computer system to perform actions of a haptic feedback method, comprising:

driving one or more bone conduction haptic feedback units of a wearable haptic feedback device with at least a first signal processed from an input signal using a bone conduction head related transfer function, 'bHRTF', that models how vibrations propagate through human tissue.

\* \* \* \* \*